June 14, 1927.
C. DE LA TORRIENTE
1,632,276
APPARATUS FOR CATCHING FLIES
Filed Jan. 14, 1926
2 Sheets-Sheet 1
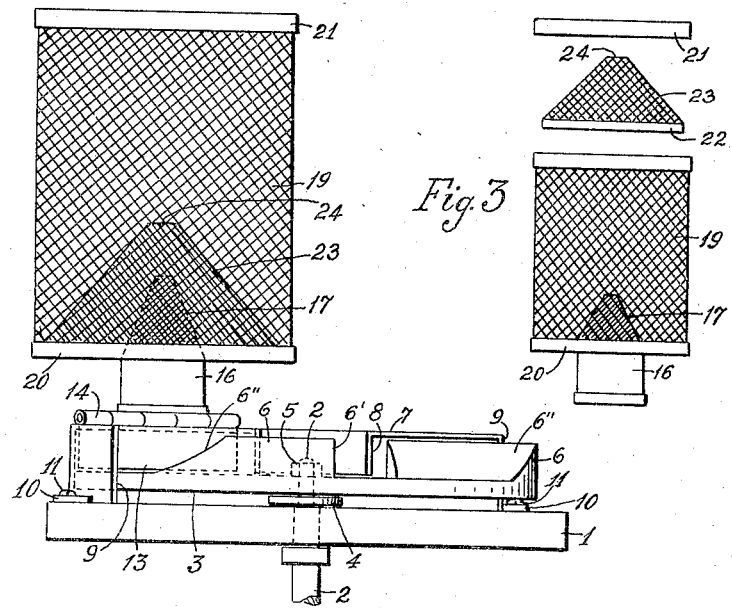
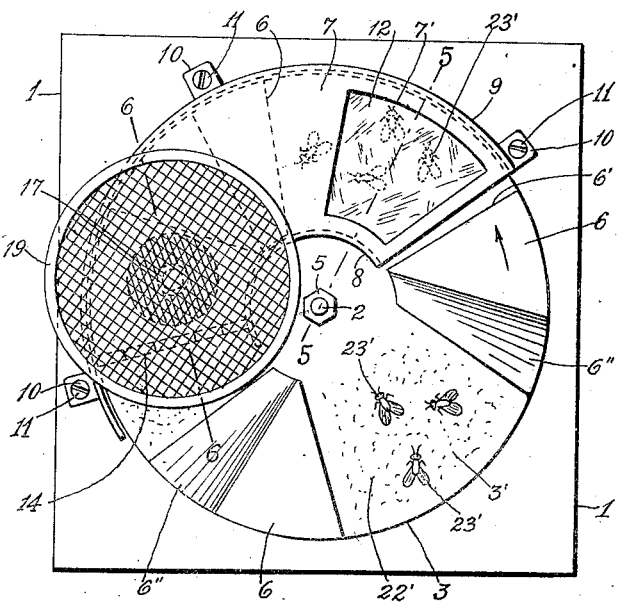
INVENTOR.
Calixto de la Torriente
BY
B. Singer
ATTORNEY.

June 14, 1927.
C. DE LA TORRIENTE
1,632,276
APPARATUS FOR CATCHING FLIES
Filed Jan. 14, 1926
2 Sheets-Sheet 2
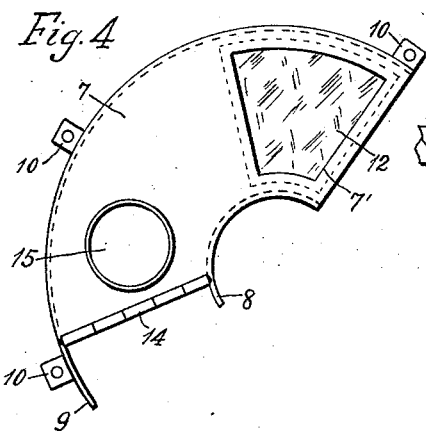
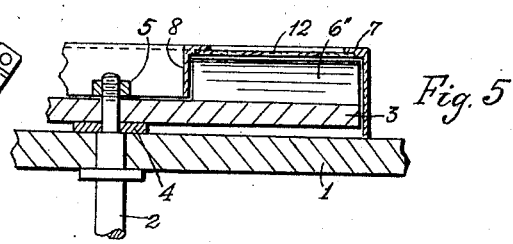
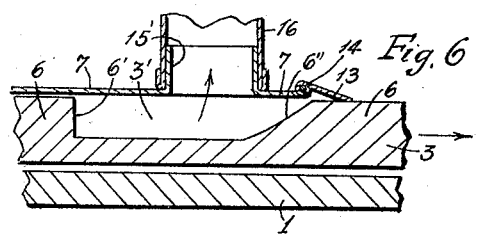
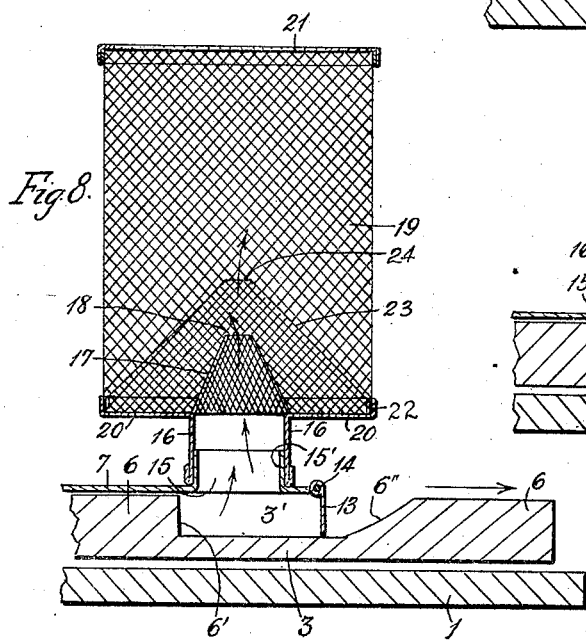
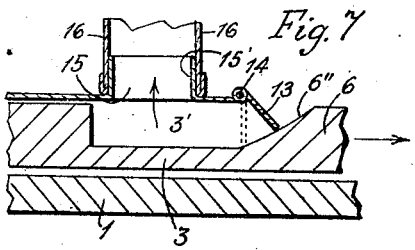
INVENTOR
Calixto de la Torriente
BY
B. Luger
ATTORNEY.

Patented June 14, 1927.

1,632,276

UNITED STATES PATENT OFFICE.

CALIXTO DE LA TORRIENTE, OF HABANA, CUBA.

APPARATUS FOR CATCHING FLIES.

Application filed January 14, 1926, Serial No. 81,283, and in Cuba November 11, 1925.

This invention relates to improvements in apparatus for catching flies, and its object is to provide an improved apparatus of this kind which catches flies without killing them, confines them in a receptacle in which they can be thereafter killed and affords the advantages of a moving bait carrier that attracts the attention of the insects and which can be readily cleansed.

The invention is described with reference to the figures of the annexed drawings, in which:

Fig. 1 is an elevation of the apparatus.

Fig. 2 is a plan of the same.

Fig. 3 is a detail elevation showing separately the cage for the caught flies, its cover and the inner trunk cone that covers its lower entrance opening.

Fig. 4 is a detail plan showing the stationary cover that cooperates with the rotary wheel for catching the flies.

Fig. 5 is a detail vertical section on the line 5—5 of Fig. 2.

Fig. 6 is a fragmentary vertical section on the line 6—6 of Fig. 2, showing a position of the wheel with respect to the cover thereof.

Fig. 7 is a sectional view similar to that of Fig. 6, showing another advanced position of the catching wheel.

Fig. 8 is a sectional view similar to Figs. 6 and 7, with the addition of the confining receptacle, showing a further advanced position of the catching wheel in its rotary motion.

This apparatus comprises a base or platform 1 across which is mounted a vertical rotating shaft 2 which bears on its upper end, a horizontal wheel 3 which is rigidly fixed thereto in any proper manner, as for instance by means of a plate or washer 4 resting on a collar projecting from shaft 2, between base 1 and wheel 3, and a nut 5 screwed on the reduced threaded end of shaft 2. This shaft 2 receives a rotary movement of very low speed, for instance a speed causing the wheel 3 to rotate once a minute, which motion is produced by any suitable mechanism, such as a chain mechanism mounted underneath platform 1 and which is not shown since it forms no part of the invention.

Wheel 3 has on its upper face a plurality of projections of an approximately triangular or trapezoidal shape 6 spaced apart throughout the circumference of the wheel and which extend from the periphery of the wheel to a point located at a certain distance from shaft 2, and each projection has a vertical side 6′ and an inclined side 6″, there being interposed between the projections 6 free hollow spaces 3′. In the drawings are illustrated three heels or projections 6 and three interposed free hollow spaces 3′. On a portion of wheel 3, partially covering the same, is a cover made of metallic sheet which comprises an upper part in the form of sector 7 connected to an inner annular wall 8 which at its lower edge flushes with the upper face of wheel 3 in the inner circle left free by the heels 3′ and is united to an outer annular wall 9 which at its lower edge flushes with the upper face of platform 1 and is fixed to the platform by three lugs 10, through openings of which pass screws 11. The upper part 7 of the cover has near the entrance end of the heels 6 of wheel 3 in the passage or duct formed by the cover, a cut section 7′ whose opening is covered with a plate of mica or any other transparent material 12 to permit the entrance section of the duct to be lighted by the exterior light, and at the opposite side said upper part 7 is a certain distance from the ends of the annular inner wall and provided with an opening between the walls 8 and 9 with a small door 13, having a hinge 14 and whose width is the same as the height of the duct formed by the lid on the open spaces 3′ of the wheel 3 between the heels 6. Between the section covered by the transparent plate 12 and the door 13 and near the latter, the upper part 7 of the lid is provided with a circular opening 15 having at its edge a vertical flange 15′ against which fits the lower portion of a cylindrical tube 16 which terminates upwardly in a trunk cone 17 made of metallic net and having an upper opening 18 and which opens into a cylinder 19 made also of metallic net and provided with a closed bottom 20 which is integral with tube 16. The cylinder 19 is closed at the upper end by a removable lid 21. In the lower end of the cylinder 19 is a net trunk-cone 23 which has a base ring 22 which bears on the bottom 20 and is provided with an opening 24 at its upper end which opens into said cylinder 19. It will be noted that space is formed between the cones 17, 23, through which the flies will have to pass before freely getting into cylinder 19.

The operation of this apparatus is as follows: Having previously poured in the base of the open spaces 3' of wheel 3 interposed between heels 3 a liquid bait, such as sweetened water 22, and imparting to the wheel slow rotary motion, as before stated, the flies 23' will settle on the base of such open spaces 3' and will be carried by wheel 3 rotating in the direction indicated by the arrow in Fig. 2 into the passage formed by cover 7 on the open spaces 3' of wheel 3, the section of transparent cover 12 being provided so that the flies may pass first through a part of lighted passage and may unsuspiciously enter before the entrance of the passage is closed by the heel 6. In this manner, the wheel continuing to rotate, the flies on the plane base of the space 3' will not be able to fly back owing to the obstruction formed by the vertical side 6' of heel 6 coming behind, and on reaching the free space 3' below the tube 16 pass upwardly through the same and through the opening 18, into the chamber formed between the two trunk-cones 17 and 23 and from thence through the opening 24 and thus pass inside cylinder 19 where they are finally caught. If any fly is delayed in the hollow space 3', the wheel, on continuing to turn, causes the small hinge door 13 which was in substantially horizontal position while passing over the fore heel 6 (Fig. 6), upon reaching the rear inclined edge 6'' will slide downward on the same by its own weight, without the slight passage being left between both (Fig. 7), until reaching the vertical position shown in Fig. 8. It will be noted that the door 13 will in all instances form a closure for the hollow space 3' in which the flies are, thus compelling those which have been delayed in flying towards the cannon 16, to finally fly into the same, as indicated in Fig. 8.

When a number of flies are gathered in the cylindrical receptacle 19, the latter can be separated and by shaping up the same it will be sufficient to kill all the flies inside, because the trunk-cone 23 being loose, its strokes against the walls of cylinder 19 will kill all the flies. For cleaning the cylinder, the cover 21 may first be taken out.

It is obvious that the form of the details of construction of the apparatus and the arrangement of the parts thereof can be varied without altering the essential feature of the invention, which is as claimed in the appended claim.

Having thus described my invention, what I claim is:

Apparatus for catching flies comprising a platform, a rotary wheel on a shaft mounted across the same and provided on its visible face with a plurality of spaced apart projections of trapezoidal shape with one edge vertically cut and the other edge forming an inclined plane, said projections leaving between them free hollow spaces, a lid covering part of the wheel and forming a tight passage for the projections of the wheel and having on its end inlet portion an open section covered with a transparent plate and being provided at its outlet end with a hinged door adapted for sliding on each projection of the wheel and for sliding downwards from each inclined edge of the same and thereby forming a closure for the following free hollow space, an outlet element located above an opening of the said lid, near the said small plate and terminating in an upwardly opening trunk-cone, a second upwardly opening trunk-cone which surrounds the first trunk-cone whereby a chamber is formed between them, and a closed receptacle located around the said trunk-cones and removable therefrom.

In witness whereof I affix my signature.

CALIXTO DE LA TORRIENTE.